US012172196B2

(12) United States Patent
Althammer

(10) Patent No.: US 12,172,196 B2
(45) Date of Patent: Dec. 24, 2024

(54) SPRAYING DEVICE FOR A CLEANING MACHINE FOR CLEANING MEDICAL, PHARMACEUTICAL AND/OR LABORATORY UTENSILS

(71) Applicant: BELIMED LIFE SCIENCE AG, Sulgen (CH)

(72) Inventor: Jürgen Althammer, Kraiburg a. Inn (DE)

(73) Assignee: BELIMED LIFE SCIENCE AG, Sulgen (CH)

( * ) Notice: Subject to any disclaimer, the term of this patent is extended or adjusted under 35 U.S.C. 154(b) by 134 days.

(21) Appl. No.: 17/830,761

(22) Filed: Jun. 2, 2022

(65) Prior Publication Data

US 2022/0388038 A1 Dec. 8, 2022

(30) Foreign Application Priority Data

Jun. 3, 2021 (EP) .................................... 21177525

(51) Int. Cl.
*B08B 3/02* (2006.01)

(52) U.S. Cl.
CPC ............... *B08B 3/024* (2013.01); *B01L 13/02* (2019.08); *B08B 2203/02* (2013.01)

(58) Field of Classification Search
None
See application file for complete search history.

(56) References Cited

U.S. PATENT DOCUMENTS 4,298,015 A 11/1981 Garza
2012/0312341 A1 12/2012 Rieder et al.
2018/0333037 A1 11/2018 Roderick et al.

FOREIGN PATENT DOCUMENTS

DE 100 39 880 A1 3/2002
DE 10 2007 038 673 B3 1/2009
EP 0 321 025 A2 6/1986
EP 1 050 263 A2 11/2000
(Continued)

OTHER PUBLICATIONS

Machine translation CN211911544 (Year: 2020).*
European Search Report Corresponding to 21177525.9 mailed Nov. 26, 2022.

*Primary Examiner* — Natasha N Campbell
(74) *Attorney, Agent, or Firm* — Finch & Maloney PLLC

(57) ABSTRACT

The invention relates to a spraying device, a cleaning machine for cleaning medical, pharmaceutical and/or laboratory utensils, a retrofitting device for retrofitting a hydraulic spraying device and a method for cleaning medical, pharmaceutical and/or laboratory utensils. At least one washing arm (3, 3*a*) is rotatably arranged on an axle (4) and can be supplied with cleaning fluid from a cleaning fluid supply line (5) in the axle (4). The washing arm (3, 3*a*) is provided with outlet openings (6) from which jets of cleaning fluid can be directed onto the utensils (8). The spraying device (2) has a drive device (9) for actively driving the washing arm (3, 3*a*). The drive device (9) comprises a turbine (11) which is in operative connection with the washing arm (3, 3*a*) in such a way that a rotation of the turbine (11) leads to a rotation of the washing arm (3, 3*a*). The drive device (9) also has a drive fluid line (10, 10*a*) separate from the cleaning fluid supply line (5). The turbine (11) can be driven by a drive fluid flowing out of the separate drive fluid line (10, 10*a*).

19 Claims, 3 Drawing Sheets

(56) References Cited

FOREIGN PATENT DOCUMENTS

Figure 1:
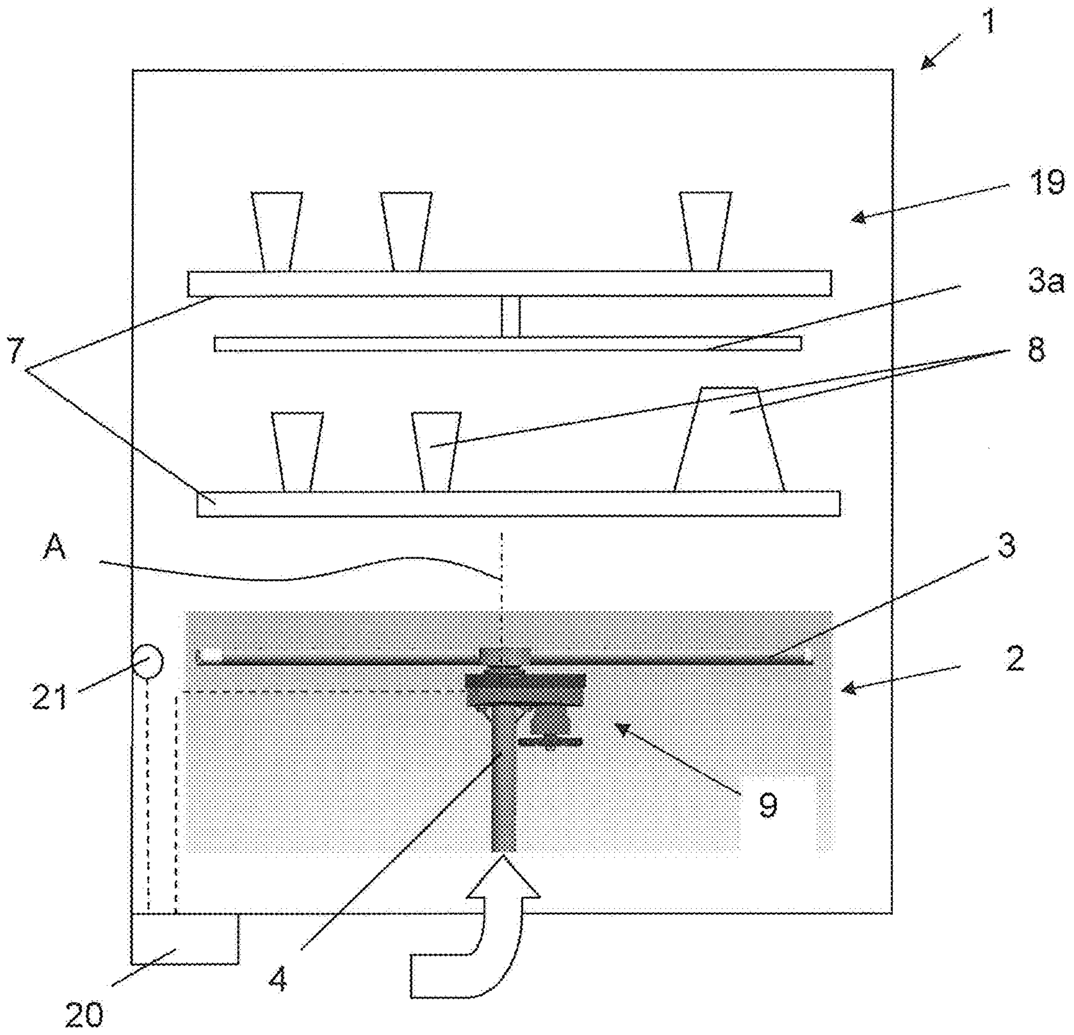

| | | | |
|---|---|---|---|
| EP | 1 183 983 | A2 | 3/2002 |
| EP | 2 452 606 | A1 | 5/2012 |
| EP | 2 480 118 | B1 | 2/2015 |
| WO | 2021/016608 | A1 | 1/2021 |

* cited by examiner

SPRAYING DEVICE FOR A CLEANING MACHINE FOR CLEANING MEDICAL, PHARMACEUTICAL AND/OR LABORATORY UTENSILS

The invention relates to a spraying device, a cleaning machine for cleaning medical, pharmaceutical and/or laboratory utensils, a retrofitting device for retrofitting a hydraulic spraying device and a method for cleaning medical, pharmaceutical and/or laboratory utensils.

In cleaning machines medical, pharmaceutical and/or laboratory utensils are exposed to a washing liquid, a rinsing liquid and/or drying air.

As described, for example, in EP2452606A1, a carriage for receiving items to be washed, which can be guided into a washing room, can have one or more tiers or planes arranged one above the other, in which the items to be washed can be arranged either directly or in baskets, each of these planes being assigned at least one washing arm. The washing arm can be arranged on the carriage for receiving items or in the washing chamber.

The washing arm can be rotated about a vertical or horizontal axis of rotation, which at the same time serves to supply a cleaning medium, such as a washing liquid, a rinsing liquid or drying air, via channels which, for example, are connected to a supply and distribution device arranged in the washing chamber when the carriage for receiving items is pushed into the washing chamber.

In the case of a hydraulic spraying device, drive of the washing arms about their axis of rotation can be achieved by appropriate design of the direction of emergence of the jets of cleaning medium from the washing arms.

Washing arms are known from EP0321025A2, the rotating shaft of which is connected to a turbine driven by the cleaning fluid. EP1183983A2 shows turbine blades in the wash arm that generate a rotary motion when water flows into the wash arm via the turbine blades.

In these known hydraulically operated wash arms, the rotational speed of the wash arm is always correlated to the amount and/or pressure of the cleaning fluid delivered.

Cleaning machines are also known in which a drive device is provided for actively driving the washing arm so that the rotation of the washing arm is independent of the supply quantity of the cleaning fluid.

For example, DE102007038673B3 shows an electric motor drive which is arranged below the rinsing chamber and in which the drive shaft is connected to the spray arm via a gear, for example a toothed gear. As shown in WO2021016608 A1, the axis of rotation of the drive shaft and the axis of rotation of the wash arm may be parallel to and spaced apart from each other.

From EP2480118B1 it is known to set the washing arm in rotation with a magnetic drive, wherein a rotatably arranged rotor with a magnet is arranged in a drying area.

The known active drive devices usually require electrically supplied components which have to be accommodated in the cleaning machine in a liquid-tight manner.

EP2452606A1 discloses a monitoring device with a rotational sensor for the rotation of the washing arms, which enables the machine to be stopped in the absence of rotation of one or more of the washing arms.

It is a task of the invention to overcome the disadvantages of the state of the art and in particular to provide a spraying device, a cleaning machine, a retrofitting kit and a method with which independent cleaning parameters can be selected in a simple manner and which enable cleaning that meets economic and hygienic requirements.

The task is solved by the features of the independent claims.

A spraying device for a cleaning machine for cleaning medical, pharmaceutical and/or laboratory utensils comprises at least one washing arm which is rotatably arranged on an axle. The washing arm can be supplied with cleaning fluid from a cleaning fluid supply line which runs in the rule within the axle.

A "washing arm" in the sense of this invention is to be understood as a device of the spraying device and of the cleaning machine, by means of which cleaning fluids can be delivered to items to be cleaned, in particular medical, pharmaceutical and/or laboratory utensils.

A fluid is understood to be a liquid and/or a gas.

Cleaning fluids can be, for example, water, with or essentially without additives, or a flushing medium of various types. Other fluid media are also conceivable, for example compressed air.

The cleaning fluid is in particular washing fluid, rinsing fluid and/or drying air. The cleaning fluid may further comprise disinfectant.

A washing arm can preferably be formed with two wings or blades. However, it is also possible for the wash arm to have multiple wings or blades, in particular, a three-blade wash arm may be provided and/or a wash arm having a star-shaped configuration.

The inner volume of the wash arm may be connected to the cleaning fluid supply line via a rotary coupling.

The washing arm is provided with outlet openings from which jets of cleaning fluid can be directed to the utensils in the washing chamber. The utensils are preferably located on a receiving trolley.

The spraying device has a drive device for actively driving the washing arm.

The drive device comprises a turbine which is operatively connected to the washing arm in such a way that a rotation of the turbine leads to a rotation of the washing arm.

The turbine comprises turbine blades, preferably airfoil blades, which are arranged on a hub.

The drive device further comprises at least one drive fluid line separate from the cleaning fluid supply line. The turbine is drivable by a drive fluid flowing out of the separate drive fluid line.

The rotation is thus caused by the outflow of the drive fluid and is thus independent of the flow rate of the cleaning fluid. The rotation and the amount of cleaning fluid can be controlled separately. The outlet openings in the washing arm can be arranged independently of the direction of rotation. They can be optimally directed towards the utensils. The outlet openings can be arranged opposite each other in the washing arm so that scissor cleaning is possible.

Depending on the load and cleaning requirements, a user can determine how fast the washing arm should rotate and how much cleaning fluid should flow out.

The drive fluid can be a liquid and/or a gas. Preferably, the cleaning fluid is used as the drive fluid. This can be supplied together with the cleaning fluid to the washing chamber. The drive fluid can be collected with the cleaning fluid in the washroom and led out of the washroom.

Alternatively, compressed air can be used as the drive fluid. The separate drive fluid line is then designed as a compressed air line.

An electrical supply to the drive unit is not necessary.

There can be a turbine for each washing arm.

The drive fluid line can be at least partially guided transversely to the axle.

Preferably, at least part of the separate drive fluid line is arranged in the axle and/or parallel to the axle. This enables a space-saving design.

The turbine may be arranged such that the axis of rotation of the turbine hub is transverse, for example perpendicular, to the axis of rotation of the wash arm.

Preferably, the axis of rotation of the turbine is aligned parallel to the axis of rotation of the wash arm.

The axis of rotation of the turbine can coincide with the axis of rotation of the wash arm. For example, the turbine may be fixedly connected to the wash arm. The rotation of the turbine is then transmitted 1:1 to the wash arm.

The turbine can be arranged inside the wash arm. Preferably, the turbine is spaced from the wash arm in the axial direction. In the case of wash arms that rotate about a vertically extending axis of rotation, this is a vertical distance. The turbine is preferably arranged below the wash arm. It can also be arranged above the washing arm.

In the case of wash arms rotating about a horizontal axis of rotation, this is a lateral distance.

The separate drive fluid line has at least one outflow opening which is arranged such that drive fluid flowing out of the outflow opening impinges on the turbine.

The outflow opening can be arranged in such a way that the outflowing jet is not perpendicular to the axis of rotation of the turbine. However, the outflow opening is preferably arranged at the same axial height as the turbine so that the outflowing jet has the shortest possible path to the turbine blade.

Preferably, the separate drive fluid line has an outflow opening with a nozzle directed towards the turbine, transverse to the turbine blades.

The separate drive fluid line may also have two, preferably closable, outflow nozzles, one nozzle being directed towards one side of the turbine and a second nozzle being directed towards another side of the so that from one nozzle a front side of the turbine blades is irradiated, from the other nozzle a rear side of the turbine blades is irradiated. Depending on which nozzle is open, the turbine rotates in one direction or the other. The user can thus also select the direction of rotation of the turbine.

There may also be provided per turbine a first, preferably closable, separate drive fluid line with a first nozzle and a second, preferably closable, separate drive fluid line with a second nozzle directed in a different direction than the first nozzle.

The turbine may be directly connected to the washing arm. In order to drive the turbine, a relatively high pressure must be provided in the drive fluid line, which can be generated by a corresponding pump.

The spraying device can alternatively include a gear box for transmitting rotational torque from the turbine to the wash arm.

The rotation of the turbine can thus be effectively transmitted to the wash arm even for small diameter turbines or at a lower pressure of the drive fluid.

The gear box may include a spur gear and/or a planetary gear.

Alternatively, a chain, belt or magnetic transmission means may be provided.

Preferably, the drive fluid is the same cleaning fluid that is intended to flow from the wash arm.

The spraying device may include at least one fluid diverter so that the cleaning fluid supply line and the separate drive fluid line may be fed from the same cleaning fluid supply line.

A cleaning fluid circuit may be provided that includes a reservoir, a pump, and a collection line out of the washroom. The cleaning fluid supply line and the separate drive fluid line may be fluidically connected in parallel in the cleaning fluid circuit.

The spraying device may include at least one device for adjusting a pressure in the separate drive fluid line and/or a flow rate through the separate drive fluid line. In particular, a throttle valve and/or a pump may be provided in the separate drive fluid line.

The device for adjusting pressure and/or flow rate may be located downstream of a fluid diverter as described above.

The problem is further solved by a cleaning machine for cleaning medical, pharmaceutical and/or laboratory utensils comprising a washing chamber and a spraying device as described above.

The at least one washing arm can be arranged on a trolley for receiving items, which can be inserted into the washing chamber. In particular, a plurality of washing arms may be arranged on individual superimposed planes of a trolley for receiving items. Alternatively or additionally, washing arms mounted in the washing chamber may be associated with individual planes of a receiving trolley.

The cleaning machine can comprise a control unit via which the speed of the at least one washing arm can be adjusted. The control unit can be used to control the flow rate and/or pressure in the separate drive fluid line. For example, the pump capacity can be changed, the position of a valve in the separate drive fluid line can be changed, and/or more or less cleaning fluid, in particular compressed air, can be provided.

The control unit can also be used to adjust how much cleaning fluid emerges through the outlet openings of the washing arm.

The cleaning machine can be connected to a compressed air network and/or comprise a compressed air tank, in particular if compressed air is to be used as the drive fluid.

The cleaning machine can be connected to a water network and/or have a storage tank for cleaning fluid.

The solution according to the invention can be used in different cleaning plants. Small cleaning plants require significantly less water and a lower fluid pressure than larger cleaning plants, both for cleaning and for driving the washing arm.

The cleaning machine may include a rotation sensor to determine whether the washing arm is rotating and in particular how fast and/or in which direction it is rotating. Preferably, a rotation sensor is provided as disclosed in EP2452606A1.

The cleaning machine may comprise a control unit, which may be designed to adjust the rotational speed of the at least one washing arm based on measured values of the rotation sensor.

By means of the control unit, a rotational speed and, if necessary, a rotational direction can be entered. The sensor can measure the actual rotational speed, and if necessary the direction of rotation. The control unit can change the pressure and/or the flow through the separate drive fluid line, if and as long as the measured speed, and if necessary direction of rotation, do not match the preselected speed, and if necessary direction of rotation. A match exists if the deviation between the preset nominal value and the measured value is smaller than a preselected tolerance range.

The step sizes for the pressure and/or flow rate change as well as the tolerance range can be selected and set in the control unit.

The control unit can comprise an operator interface.

The task is further solved by a retrofitting device for retrofitting a hydraulic spraying device to a spraying device as described above, comprising at least one separate drive fluid line and at least one turbine. The retrofitting device may further include a fluid diverter and/or a gear box.

The retrofitting device may be mounted in a cleaning machine.

The problem is further solved by a method for cleaning medical, pharmaceutical and/or laboratory utensils, in particular in a cleaning machine as described above.

At least one washing arm rotates on an axle. Cleaning fluid is supplied to the washing arm via a cleaning fluid supply line, which preferably runs along the axle. The cleaning fluid is directed from outlet openings of the washing arm onto the utensils, which are preferably located on a receiving trolley.

The washing arm is actively driven. For this purpose, drive fluid, in particular cleaning fluid, flows out of at least one outlet opening of a drive fluid line separate from the cleaning fluid supply line. The outflowing drive fluid drives a turbine which is operatively connected to the washing arm, whereby a rotation of the turbine leads to a rotation of the washing arm.

The cleaning fluid supply line and the separate drive fluid line are preferably fed with cleaning fluid from a common supply line.

A control unit can be used to adjust the flow rate of the drive fluid from the at least one outflow opening, in particular by adjusting a valve in the drive fluid line. The control unit can thus be used to adjust how fast the washing arm rotates.

The invention will be explained in further detail below with reference to examples of embodiments shown in the drawing.

Figure 2:
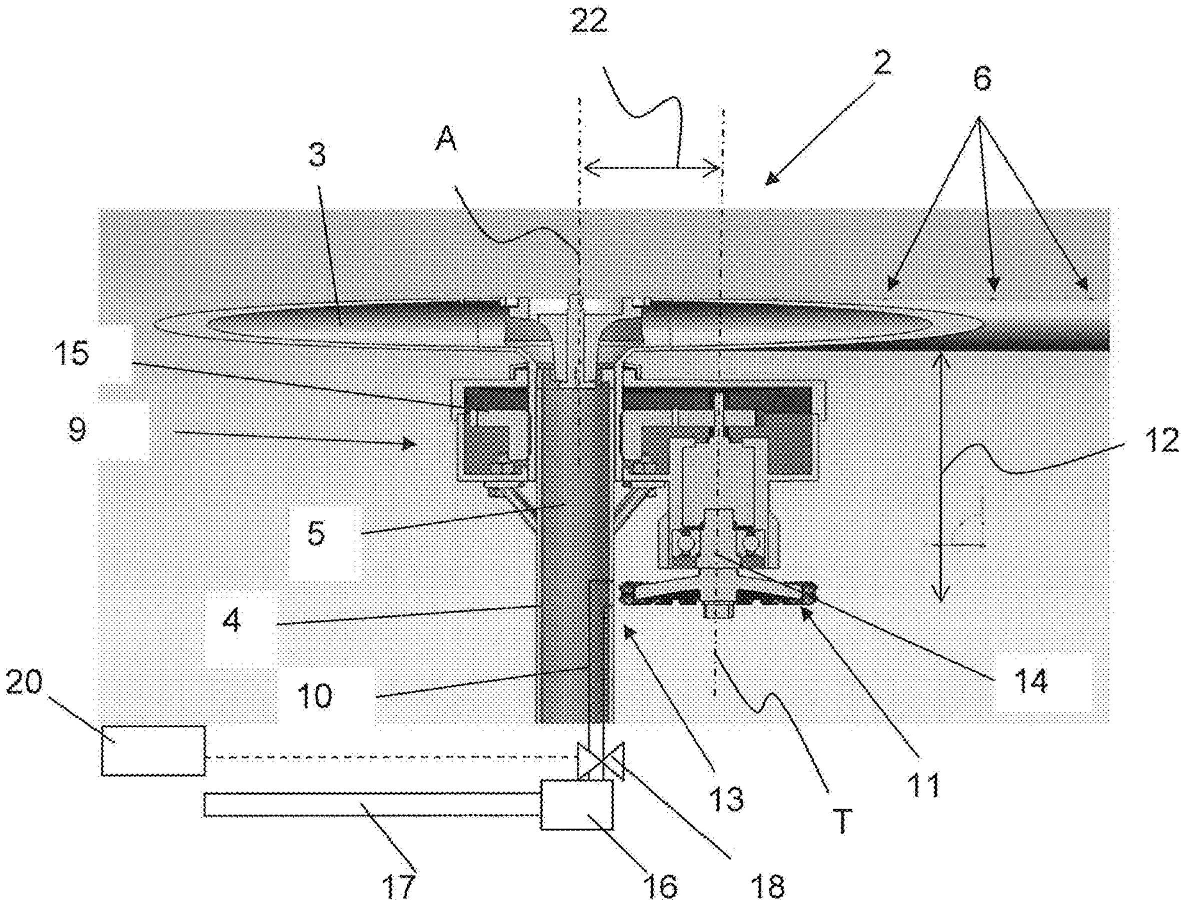
Figure 3:
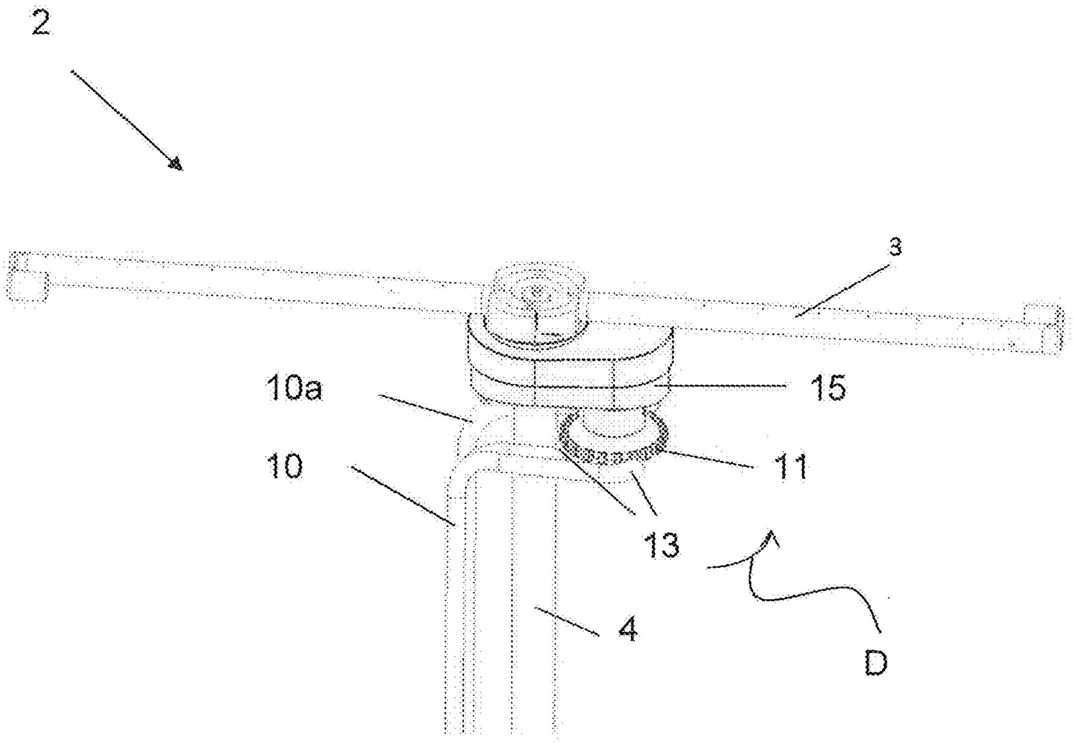

The drawings show:

FIG. 1 a schematic front view of a cleaning machine;

FIG. 2 a sectional view of a first example of a spraying device;

FIG. 3 a perspective view of a second example of a spraying device.

FIG. 1 shows a schematic front view of a cleaning machine 1. The cleaning machine 1 comprises a washing chamber 19 in which a spraying device 2 is mounted.

The spraying device 2 is used to spray cleaning fluid onto utensils 8 arranged on a receiving trolley 7.

The spraying device 2 comprises a washing arm 3 arranged in the washing chamber 19, which is arranged rotatably about an axis of rotation A on an axle 4. A further washing arm 3*a* is arranged on the trolley for receiving items 7, which can be inserted into the washing chamber 19.

The spraying device 2 comprises a drive device 9 for actively driving the washing arm 3. The washing arm 3*a* arranged on the trolley for receiving items 7 is also equipped with a drive device 9 which is not explicitly shown.

The washing machine 2 comprises a rotation sensor 21, and the measured values are transmitted to a control unit 20.

The control unit 20 can be used to adjust the drive device 9 and thus the rotational speed of the washing arm 3.

If the rotation sensor 21 does not measure the desired speed, the control unit 20 adjusts the drive device 9 until the desired speed is reached. For this purpose, the control unit 20 can adjust a throttle valve 18 (see FIG. 2) of the drive device 9.

FIG. 2 shows a sectional view of a first example of a spraying device 2 with washing arm 3 and drive device 9.

Cleaning fluid can be supplied to the washing arm 3 via a cleaning fluid supply line 5 in the axle 4. The cleaning fluid is discharged from outlet openings 6 in the washing arm 3.

The drive device 9 comprises a turbine 11 which drives the washing arm 3 via a gear box 15. A rotation of the turbine 11 causes a rotation of the washing arm 3.

Drive fluid is brought to an outlet opening 13 through a drive fluid line 10 separate from the cleaning fluid supply line 5, which in this case also runs in the axis 4. From here, the drive fluid flows onto the turbine 11 and causes it to rotate.

The axes of rotation T through the shaft 14 of the turbine 11 and the axis of rotation A of the washing arm 3 are arranged parallel to each other and have a distance 22.

The turbine 11 is arranged below the washing arm 3 and has a distance 12 from the washing arm 3 in the direction of the axes of rotation.

The drive fluid in this case is a cleaning fluid, which is brought in via a supply line 17. In a fluid diverter 16, the inflow is divided, with part of the cleaning fluid flowing into the cleaning fluid supply line 5, and part of the cleaning fluid flowing into the drive fluid line 10. Downstream of the fluid diverter 16, a throttle valve 18 is provided, with which the flow rate of the drive fluid can be adjusted. The valve 18 is controlled by the control unit 20.

FIG. 3 shows a perspective view of a second example of a spraying device 2.

In this case, two drive fluid lines 10, 10*a* run in parallel but outside the axle 4. Each of the drive fluid lines 10 has two outflow openings 13.

If drive fluid flows through the first drive fluid line 10, the turbine 11 rotates in a first direction of rotation D, if drive fluid flows through the second drive fluid line 10*a*, the turbine 11 rotates in the other direction.

The rotation of the turbine 11 is transmitted to the washing arm 3 via a gear box 15.

The invention claimed is:

1. A spraying device for a cleaning machine for cleaning medical, pharmaceutical and/or labor utensils, wherein at least one washing arm is rotatably arranged on an axle and can be supplied with cleaning fluid from a cleaning fluid supply pipe, wherein the at least one washing arm is provided with outlet openings, from which cleaning fluid jets can be directed onto the utensils, the spraying device has a drive unit for actively driving the at least one washing arm, wherein the drive unit comprises a turbine which is operatively connected to the at least one washing arm in such a way that a rotation of the turbine leads to a rotation of the at least one washing arm, and wherein the drive unit further comprises a drive fluid pipe separate from the cleaning fluid supply pipe, and the turbine is drivable by a drive fluid flowing out of the separate drive fluid pipe, wherein at least a part of the separate drive fluid pipe is arranged in the axle and/or parallel to the axle.

2. The spraying device according to claim 1, wherein the rotation axis of the turbine is aligned parallel to the rotation axis of the at least one washing arm.

3. The spraying device according to claim 2, wherein the rotation axis of the turbine is at a distance from the rotation axis of the at least one washing arm.

4. The spraying device according to claim 2, wherein the turbine has a distance from the at least one washing arm in an axial direction.

5. The spraying device according to claim 1, wherein the separate drive fluid pipe has at least one outflow opening arranged such that drive fluid flowing out of the outflow opening hits the turbine.

6. The spraying device according to claim 5, wherein the outflow opening is arranged at the same axial height as the turbine.

7. The spraying device according to claim 1, wherein the spraying device comprises a gear box for torque transmission from the turbine to the at least one washing arm.

8. The spraying device according to claim 7, wherein the gear box comprises a spur gear and/or a planetary gear.

9. The spraying device according to claim 1, wherein the spraying device comprises at least one fluid diverter, wherein the cleaning fluid supply pipe and the separate drive fluid pipe can be fed from the same supply line for cleaning fluid.

10. The spraying device according to claim 1, wherein the spraying device comprises at least one pressure adjusting device and/or flow rate adjusting device in the separate fluid line.

11. A cleaning machine for cleaning medical, pharmaceutical and/or laboratory utensils comprising a wash chamber and a spraying device according to claim 1.

12. The cleaning machine according to claim 11, wherein at least one washing arm is arranged on a wash load receiving trolley which can be inserted into the wash chamber.

13. The cleaning machine according to claim 12, wherein several washing arms are arranged on individual superimposed levels of the wash load receiving trolley.

14. The cleaning machine according to claim 11, wherein the cleaning machine comprises a control unit by which the speed of the at least one washing arm can be adjusted.

15. The cleaning machine according to claim 11, wherein the cleaning machine comprises a rotation sensor.

16. The cleaning machine according to claim 15, wherein the control unit is designed to adjust the speed of the at least one washing arm based on measured values of the rotation sensor.

17. A method for cleaning medical, pharmaceutical and/or laboratory utensils, in a cleaning machine according to claim 11, wherein the at least one washing arm rotates on the axle, the cleaning fluid is supplied to the at least one washing arm via the cleaning fluid supply line in the axle, and the cleaning fluid is directed from outlet openings of the washing arm onto the utensils wherein the at least one washing arm is actively driven, and wherein drive fluid flows out of at least one outflow opening of the drive fluid pipe separate from the cleaning fluid supply line and drives the turbine which is operatively connected to the at least one washing arm, a rotation of the turbine leading to a rotation of the at least one washing arm.

18. The method according to claim 17, wherein the cleaning fluid supply line and the separate drive fluid pipe are supplied with cleaning fluid from a common supply line.

19. The method according to claim 17, wherein the flow rate of the drive fluid from the at least one outflow opening is adjusted via a control unit.

* * * * *